(12) United States Patent
Roh et al.

(10) Patent No.: US 8,175,045 B2
(45) Date of Patent: May 8, 2012

(54) APPARATUS AND METHOD FOR TRANSMITTING UPLINK FEEDBACK DATA IN A BROADBAND WIRELESS MOBILE COMMUNICATION SYSTEM

(75) Inventors: Kwan-Hee Roh, Hwaseong-si (KR); Jin-Kyu Koo, Suwon-si (KR); Jae-Hee Cho, Seoul (KR); Jeong-Ho Park, Seoul (KR); Tae-Young Kim, Seongnam-si (KP); Soon-Young Yoon, Seoul (KR); Ho-Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1059 days.

(21) Appl. No.: 12/049,481

(22) Filed: Mar. 17, 2008

(65) Prior Publication Data

US 2008/0232312 A1    Sep. 25, 2008

(30) Foreign Application Priority Data

Mar. 19, 2007   (KR) .............................. 2007-0026633

(51) Int. Cl.
*H04W 4/00* (2009.01)
(52) U.S. Cl. ....................................... 370/329; 370/436
(58) Field of Classification Search .................. 370/203, 370/209, 328–329, 335, 338, 449, 465–466, 370/479
See application file for complete search history.

(56) References Cited

U.S. PATENT DOCUMENTS

| 7,715,358 | B2 * | 5/2010 | Li et al. .......................... 370/344 |
| 2006/0013185 | A1 * | 1/2006 | Seo et al. ....................... 370/343 |
| 2006/0176803 | A1 * | 8/2006 | Oh et al. ......................... 370/210 |
| 2008/0043610 | A1 * | 2/2008 | Li et al. .......................... 370/203 |
| 2008/0095223 | A1 * | 4/2008 | Tong et al. ..................... 375/228 |
| 2008/0119213 | A1 * | 5/2008 | Ihm et al. ....................... 455/507 |
| 2008/0181181 | A1 * | 7/2008 | Gorokhov et al. ............ 370/335 |
| 2009/0046569 | A1 * | 2/2009 | Chen et al. ..................... 370/203 |
| 2009/0303918 | A1 * | 12/2009 | Ma et al. ......................... 370/315 |
| 2010/0189049 | A1 * | 7/2010 | Lim et al. ....................... 370/329 |

FOREIGN PATENT DOCUMENTS

| JP | 2006-211651 A | 8/2006 |
| KR | 10-2006-0039804 A | 5/2006 |
| KR | 10-2006-0078880 A | 7/2006 |

* cited by examiner

*Primary Examiner* — Chi H. Pham
*Assistant Examiner* — Kevin Mew
(74) *Attorney, Agent, or Firm* — Jefferson IP Law, LLP

(57) ABSTRACT

An apparatus and a method for transmitting uplink feedback data in a broadband wireless mobile communication are provided. The method comprises dividing tiles used as a feedback channel into a preset number of groups, selecting one group among the preset number of groups using a downlink channel, selecting a number of tiles, the number of tiles being equal to a number of tiles required for feedback data transmission in the selected group, and mapping feedback data to each selected tile. Thereby, feedback information can be transmitted via a tile selected by a terminal based on a channel state without a process of allocating and reallocating an additional feedback channel, thus enhancing efficiency of uplink wireless resources.

37 Claims, 7 Drawing Sheets

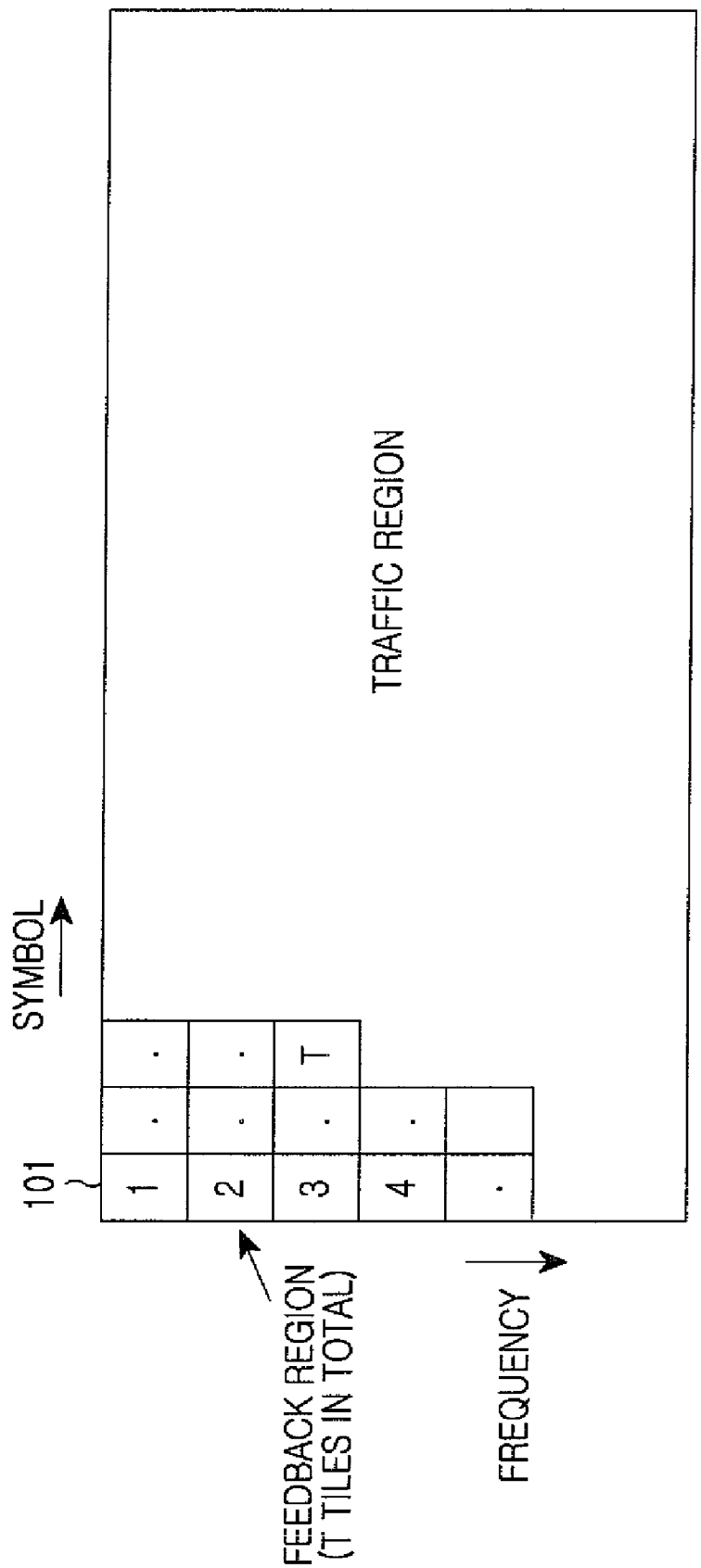

APPARATUS AND METHOD FOR TRANSMITTING UPLINK FEEDBACK DATA IN A BROADBAND WIRELESS MOBILE COMMUNICATION SYSTEM

PRIORITY

This application claims the benefit under 35 U.S.C. §119(a) to a Korean patent application filed in the Korean Intellectual Property Office on Mar. 19, 2007 and assigned Serial No. 2007-26633, the entire disclosure of which is hereby incorporated by reference.

BACKGROUND OF THE INVENTION

1. Field of the Invention

The present invention relates to an apparatus and a method for transmitting uplink feedback data in a broadband wireless mobile communication system. More particularly, the present invention relates to an apparatus and a method for transmitting uplink feedback data via a feedback channel configured by using a preferred channel selected by a terminal through a downlink channel when feedback information should be transmitted non-periodically, in a Time Division Duplexing (TDD) Orthogonal Frequency Division Multiplexing (OFDM) broadband wireless mobile communication system.

2. Description of the Related Art

In a wireless mobile communication system, channel quality of a reception signal may deteriorate over time. Therefore, an Automatic Repeat reQuest (ARQ) technique is applied to ensure that communication signals can be correctly received. In particular, a recent mobile communication system introduces a Hybrid Automatic Repeat reQuest (HARQ) technique for more accurate communication of transmission signals. Under the HARQ technique, feedback information including Acknowledgement (ACK) and Negative Acknowledgement (NAK) is transmitted through an additional feedback channel. Furthermore, in a recent cellular wireless mobile communication system, to more efficiently utilize wireless resources, signals are transmitted by adaptively changing a modulation method and a coding rate according to a channel change scheme, which is called an Adaptive Modulation and Coding (AMC) scheme. To apply the AMC scheme, a transmitter needs to have channel information in advance. In a general Time Division Duplexing (TDD) system, the transmitter predicts a channel state based on a reciprocity of uplink/downlink channels or identifies the channel state through information transmitted via an additional feedback channel. In a cellular wireless mobile communication system, the effects of interference signals may differ in the uplink/downlink channels. Hence, in most mobile communication systems, including an IEEE 802.16e system, an additional feedback channel (for example, Channel Quality Indication (hereinafter, referred to as CQI)) is established and a terminal transmits downlink channel information, for example, Carrier to Interference and Noise Ratio (hereinafter, referred to as CINR) to a base station via this feedback channel.

Meanwhile, to inform of the ACK, NAK and CINR, the system sets a portion of the uplink wireless resource as a feedback channel, leading to a reduction in the amount of usable wireless resource. Therefore, the feedback channel needs to be limited to a reasonable level in consideration of the number of users in the system, to reduce waste due to overhead. As described above, to efficiently support an uplink feedback channel with limited wireless resources, a proper technique for a feedback channel design and an efficient method for resource management are required.

In a conventional IEEE 802.16e system, a part of the uplink frame is designated as a control channel, and a portion of the designated part of the uplink frame is used as the ACK, NAK and CQI channels. The system allocates a specific sub-channel to a terminal requiring an uplink feedback channel and reallocates the sub-channel if the terminal does not need the uplink feedback channel. In the conventional method, if a specific sub-channel is selected, N fixed tiles are selected, and a terminal transmits feedback information via the sub-channel comprised of corresponding tiles. For example, the IEEE 802.16e system defines three symbol sections in the uplink as a control channel to have 35 sub-channels with a 4×3 tile structure, and uses the sub-channels as the ranging, ACK, NAK and CQI channels. In the conventional method as described above, when the sub-channel is allocated to each terminal for the ACK, NAK and CQI channel feedback, the channel state of each terminal is not considered. Therefore, the conventional method has a disadvantage in terms of efficiency in resource allocation. For example, a base station may allocate a sub-channel comprised of preset number of tiles to a corresponding terminal as a feedback channel regardless of the channel state of the terminal, and each terminal uses the sub-channel allocated by the base station.

In contrast, a terminal may select a preferred tile in consideration of the channel state measured from a downlink. In this case, to inform the base station of information on the tile selection, the terminal needs additional signaling. There are two methods for informing the base station of information on the selected tile. The first method is a method of directly transmitting corresponding information as a message. The second method is a method of indirectly transmitting the information by multiplying each tile by a user-identification code. As described above, the method of allocating the feedback sub-channel by selecting a preferred tile by a terminal has an advantage of reducing overhead according to the allocation and reallocation of a resource. That is, the feedback sub-channel allocation method applied to the conventional IEEE 802.16e system is appropriate for a periodic transmission because when informing of the CINR via the CQI channel, the CINR is informed at a constant interval regardless of any changes in the channel. However, this is disadvantageous in that secondary overhead may occur due to frequent allocation and reallocation processes in a non-periodical transmission. In contrast, in the method of allocating the feedback sub-channel by selecting a preferred tile by a terminal, the terminal informs the base station of the CINR non-periodically only when some changes occur, thereby reducing the usage rate of the uplink feedback channel and consequently decreasing overhead.

Meanwhile, in the method of allocating the feedback sub-channel by selecting a preferred tile by the terminal, the base station needs information on the tile selected by the terminal in advance to receive the feedback information of each terminal. For example, when the number of tiles that can be used is T and the number of the tiles selected by the terminal is N (T>N), the number of combinations that the terminal can select is $T_CN$. That is, since the base station does not have information on which tile was selected by the terminal, it should perform detection for all combinations. Moreover, if the number of terminals using the uplink feedback channel is increased, the amount of calculations performed by the base station is also increased in proportion thereto. Accordingly, a method is desired which can achieve a compromise in terms of the increase of resource usage efficiency and the amount of calculations needed to be performed by the base station.

SUMMARY OF THE INVENTION

An aspect of the present invention is to address the above-mentioned problems and/or disadvantages and to provide at least the advantages described below. Accordingly, an aspect of the present invention is to provide an apparatus and a method for transmitting uplink feedback data in a broadband wireless mobile communication system.

Another aspect of the present invention is to provide an apparatus and a method for transmitting feedback information via a tile selected by a terminal without a process of allocating and reallocating an additional feedback channel when the terminal transmits the feedback information to a base station non-periodically in a broadband wireless mobile communication system.

Still another aspect of the present invention is to provide an apparatus and a method for transmitting uplink feedback data via a feedback channel which is configured by using a preferred channel selected by a terminal through a downlink channel in a broadband wireless mobile communication system.

According to one aspect of the present invention, a method for transmitting feedback data of a terminal in a mobile communication system is provided. The method includes dividing tiles used as a feedback channel into a preset number of groups, selecting one group among the preset number of groups using a downlink channel, selecting a number of tiles, the number of tiles being equal to a number of tiles required for feedback data transmission in the selected group, and mapping feedback data to each selected tile.

According to another aspect of the present invention, a method for receiving feedback data by a base station in a mobile communication system is provided. The method includes dividing tiles used as a feedback channel into a number of groups, selecting a group and a user identification code by using all possible combinations of all groups and all user identification codes, and detecting data by multiplying feedback data corresponding to tiles of the selected group by the selected user identification code.

According to further aspect of the present invention, an apparatus for transmitting feedback data of a terminal in a mobile communication system is provided. The apparatus includes a tile divider for dividing tiles used as a feedback channel into a preset number of groups, a preferred group selector for selecting a group among the preset number of groups using a downlink channel, a tile selector for selecting a number of tiles, the number of tiles being equal to a number of tiles required for transmission of feedback data within the selected group, and a mapper for mapping feedback data to each selected tile.

According to still another aspect of the present invention, an apparatus for receiving feedback data of a base station in a mobile communication system is provided. The apparatus includes a tile divider for dividing tiles used as a feedback channel into a preset number of groups, a user identification code applier for selecting a group from the preset number of groups and a user identification code by using all possible combinations of all of the preset number of groups and all user identification codes, and a detector for detecting data by multiplying feedback data corresponding to tiles of the selected group by the selected user identification code.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF EXEMPLARY EMBODIMENTS below, it may be advantageous to set forth definitions of certain words and phrases used throughout this disclosure: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this disclosure, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 illustrates a feedback region according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Those skilled in the art will understand that the principles of the present disclosure may be implemented in any suitably arranged wireless communication system.

Hereinafter, an apparatus and a method for transmitting uplink feedback data in a broadband wireless mobile communication system will be described.

Here, it is assumed that all terminals use different codes, and a base station possesses a user identification code of each terminal through a basic capability negotiation. In this case, a pseudo noise (PN) code or a walsh code may be used as the user identification code for identifying each terminal.

FIG. 1 illustrates a feedback region according to an exemplary embodiment of the present invention.

Referring to FIG. 1, the feedback region is comprised of T tiles. Here, the feedback region may use an entire frequency band or only a part of a frequency band. One tile 101 is comprised of P continuous sub-carriers and Q continuous symbols on a frequency (for example, a 4×3 tile structure in the IEEE 802.16e), and the size of the feedback region may be increased in a unit of the tile 101 in proportion to the size of necessary feedback channel.

Figure 2A:
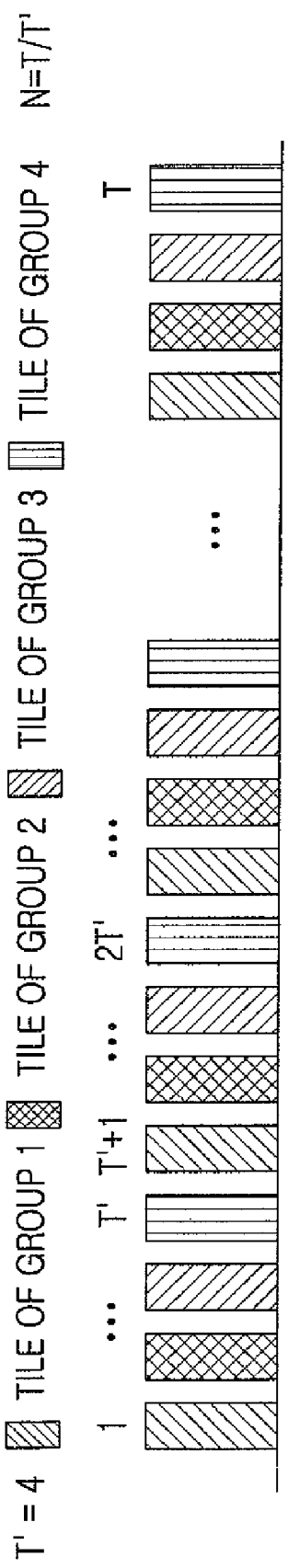
FIGS. 2A and 2B illustrate methods for dividing tiles into groups according to an exemplary embodiment of the present invention.
Figure 2B:
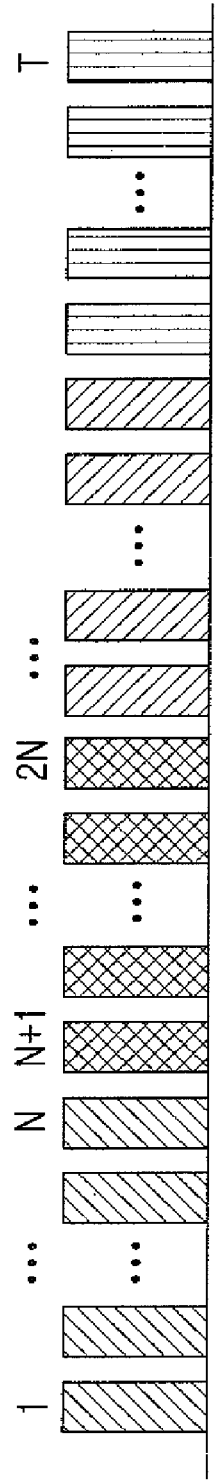

Here, the usable T tiles may be divided into T' (for example, 4) groups. Various methods may be used to divide the tiles into groups. For example, as shown in FIG. 2A (comb type), the first to $T'^{th}$ tiles of the T usable tiles are sequentially allocated to the first to $T'^{th}$ groups, the $T'+1^{th}$ to $2T'^{th}$ tiles are sequentially allocated to the first to $T'^{th}$ groups, and the remaining tiles may be allocated to the first to $T'^{th}$ groups in the same way. In this case, the number N of tiles allocated to one group is identical to T/T'. In addition, as illustrated in FIG. 2B (cluster type), the first to $N^{th}$ tiles of the T usable tiles may be allocated to a first group, the $N+1^{th}$ to $2N^{th}$ tiles may be allocated to a second group, and the remaining tiles may be allocated in the same way. It is also possible to mix the tile grouping methods of these two examples.

Figure 3:
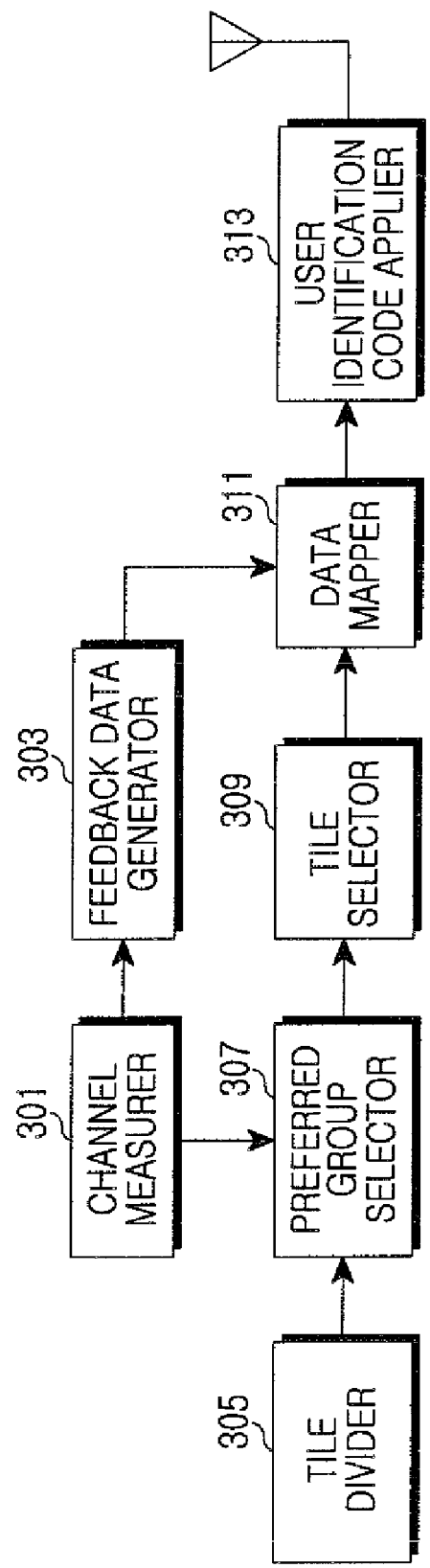
FIG. 3 illustrates a configuration of an apparatus for transmitting uplink feedback data of a terminal in a broadband wireless mobile communication system according to an exemplary embodiment of the present invention.

FIG. 3 illustrates a configuration of an apparatus for transmitting uplink feedback data of a terminal in a broadband wireless mobile communication system according to an exemplary embodiment of the present invention.

As shown in FIG. 3, the apparatus for transmitting uplink feedback data comprises a channel measurer 301, a feedback data generator 303, a tile divider 305, a preferred group selector 307, a tile selector 309, a data mapper 311, and a user identification code applier 313.

Referring to FIG. 3, the channel measurer 301 measures a downlink channel, and when feedback information is transmitted non-periodically, outputs the measured information on the downlink channel to the preferred group selector 307 and the feedback data generator 303.

The feedback data generator 303 generates uplink feedback data including the measured downlink channel information and outputs it to the data mapper 311.

The tile divider 305 divides tiles in a feedback region into a preset number of groups, and outputs the divided preset number of groups to the preferred group selector 307. Here, the tile divider 305 does not divide the tiles into a preset number of groups every time. Instead, it performs this process only once, places the results into a table, and renews the table if necessary. Thereby, the preferred group selector 307 can refer to the table.

The preferred group selector 307 selects the most preferred group among the divided groups and outputs the selected group to the tile selector 309. Here, in the case of the TDD system, the preferred group selector 307 may select one group which has the best downlink channel, for example, a group in which an average downlink channel is the best or a group to which the best downlink channel belongs.

The tile selector 309 arbitrarily selects N tiles within the selected preferred group, and outputs the selected N tiles to the data mapper 311.

The data mapper 311 maps the feedback data received from the feedback data generator 303 to each selected tile and outputs it to the user identification code applier 313.

The user identification code applier 313 multiplies the feedback data mapped to each tile by a user identification code which may be preset by a base station. Thereafter, the feedback data multiplied by the user identification code is OFDM modulated to be transmitted via the corresponding tiles, and RF processed to be transmitted to the base station via a transmission (TX) antenna.

Figure 4:
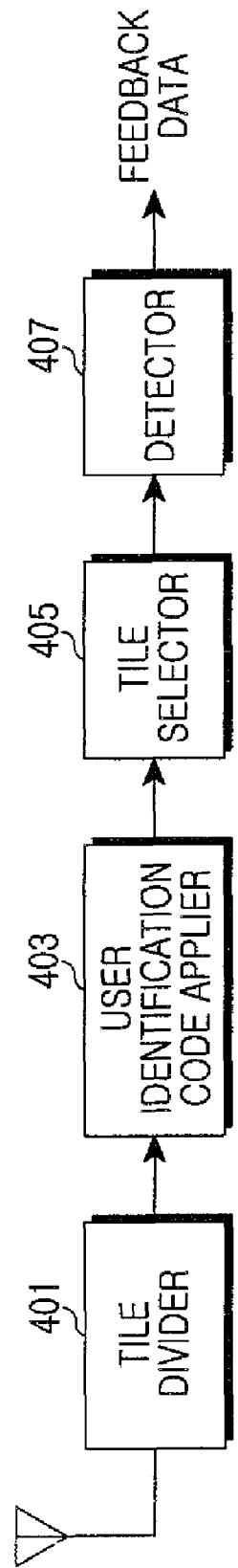
FIG. 4 illustrates a configuration of an apparatus for receiving uplink feedback data by a user of a base station in a broadband wireless mobile communication system according to an exemplary embodiment of the present invention.

FIG. 4 illustrates a configuration of an apparatus for receiving uplink feedback data by a user of a base station in a broadband wireless mobile communication system according to an exemplary embodiment of the present invention.

As shown in FIG. 4, the apparatus for receiving uplink feedback data comprises a tile divider 401, a user identification code applier 403, a tile selector 405, and a detector 407. Although not shown, the data received via an antenna is RF-processed and modulated into a base-band signal, and the base-band signal is OFDM-demodulated to be converted into frequency region data.

Referring to FIG. 4, the tile divider 401 extracts feedback region data from the frequency region data, divides the tiles corresponding to the extracted feedback region data, that is, the tiles within the feedback region into a preset number of groups, and outputs them to the user identification code applier 403.

The user identification code applier 403 selects one group among the divided groups and one user identification code among all usable user identification codes (or codes used by users in an active state among the terminals within a current base station), and outputs an index of the selected groups and an index of the selected user identification codes to the tile selector 405. Thereafter, the user identification code applier 403 selects a group and a user identification code using all possible combinations and outputs the corresponding index to the tile selector 405.

The tile selector 405 arbitrarily selects N tiles within the selected group, and multiplies data corresponding to the selected N tiles by the selected user identification code, to output it to the detector 407. Here, the tile selection is performed as many times as the number of combinations which are used to select N tiles.

The detector 407 compares an output of the tile selector 405 with a reference value, and if the output is greater than the reference value, determines if it is the feedback data transmitted by a user of a corresponding user identification code.

Figure 5:
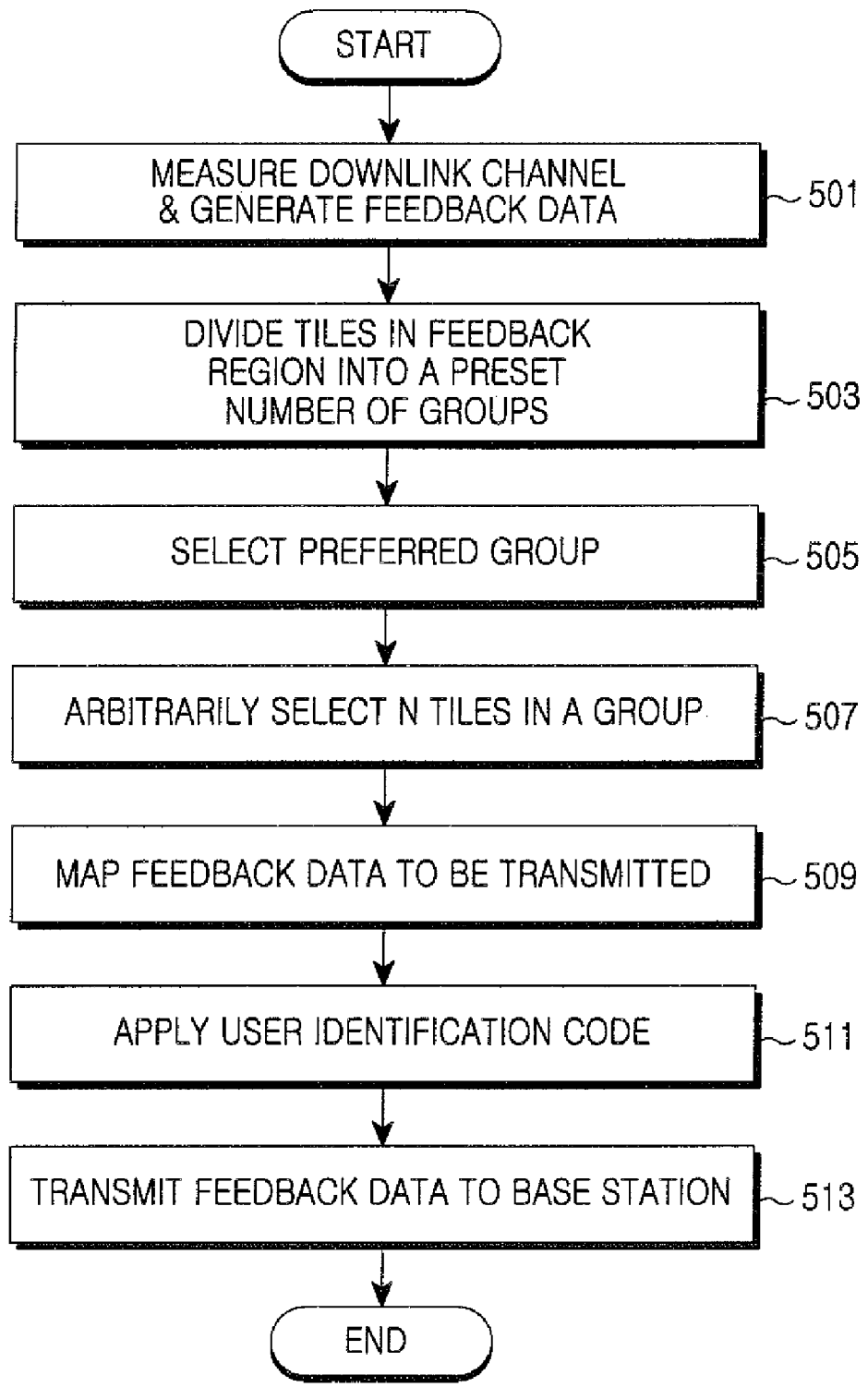
FIG. 5 illustrates a procedure of transmitting uplink feedback data by a terminal in a broadband wireless mobile communication system according to an exemplary embodiment of the present invention.

FIG. 5 illustrates a procedure of transmitting uplink feedback data by a terminal in a broadband wireless mobile communication system according to an exemplary embodiment of the present invention.

Referring to FIG. 5, in step 501, the terminal measures a downlink channel, and when feedback information is transmitted non-periodically, generates uplink feedback data including corresponding content. For example, the case when the feedback information is transmitted non-periodically may be any one of the case when as the channel state varies slowly, a non-periodical CQI report is required, the case when the NAK occurs during a NAK based ARQ operation, and the case when the conversion from a sleep mode to an active mode is intended to be informed to the base station.

Thereafter, the terminal divides in step 503 the T tiles within a feedback region into a preset number T' of groups, that is, divides the tiles to be used as the uplink feedback channel into a preset number of groups, and selects the most preferred group among the T' groups in step 505. Here, in the case of the TDD system, the terminal may select the group having the best average downlink channel or the group to which the best downlink channel belongs, based on the reciprocity of the uplink and downlink channels.

Then, the terminal selects N tiles arbitrarily within the selected group in step 507, and proceeds to step 509 to map the generated feedback data to each selected tile. Here, the number of the selected tiles is identical to the number of tiles required for transmission of the feedback information. In this case, the selected N tiles may be arranged in an ascending order of a tile index and then the generated feedback data may be mapped to the arranged tile.

Thereafter, in step 511, the terminal multiplies the data mapped to each tile by a user identification code which may be preset with the base station, and performs an OFDM modulation and RF processing to transmit the data via the corresponding tile. In step 513, the terminal transmits the data to the base station via a TX antenna.

Then, the terminal completes the algorithm.

Here, the number of tiles included in each group is identical to or greater than the number N of tiles selected by the terminal. When the number of tiles in a group is greater than N, it has an advantage of a statistical multiplexing when different users select an identical group. When the number of tiles in a group is identical to N, it has an advantage of having a simple detection process by a receiver because there is only one combination which selects N tiles in a group. Herein, it is assumed that both the base station and the terminal already have information on the grouping method of the tiles in the above procedure.

Figure 6:
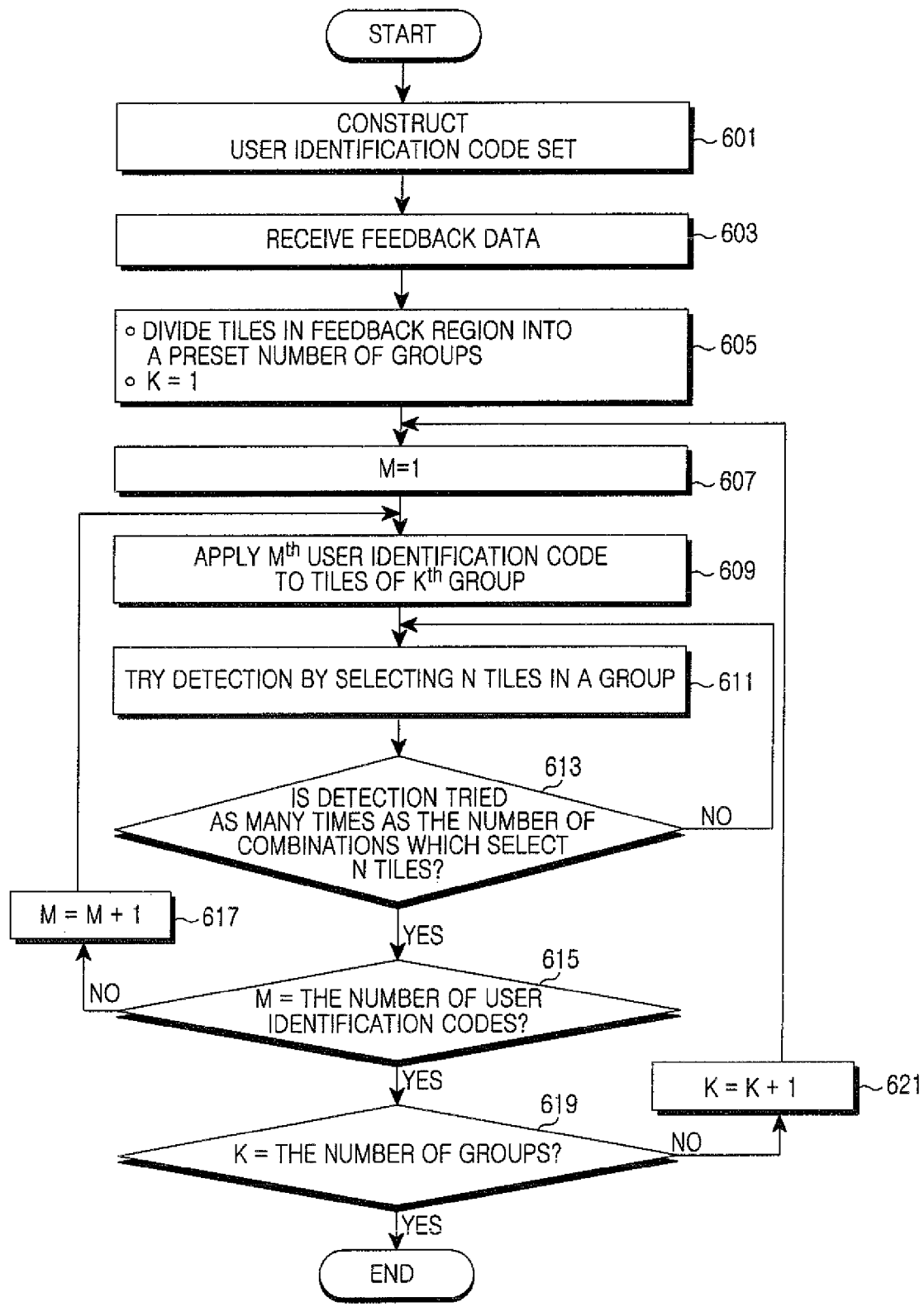
FIG. 6 illustrates a procedure of receiving uplink feedback data by a user of a base station in a broadband wireless mobile communication system according to an exemplary embodiment of the present invention.

FIG. 6 illustrates a procedure of receiving uplink feedback data by a user of a base station in a broadband wireless mobile communication system according to an exemplary embodiment of the present invention.

Referring to FIG. 6, since the base station has no information on which terminal transmitted the feedback data via the uplink feedback channel, the base station constructs a user identification code set using all usable user identification codes or if necessary, the codes of users in an active state among terminals located within a current base station coverage area in step 601.

Thereafter, the base station receives data of the feedback region in step 603, and divides the tiles in the feedback region into a preset number T' of groups in step 605. Here, a group index K is set to 1. Then, the base station sets a user index M to 1 in step 607.

In step 609, the base station applies the $M^{th}$ user identification code to the data corresponding to the tiles of the $K^{th}$ group. In step 611, the base station arbitrarily selects N tiles in the $K^{th}$ group, and tries detection by multiplying the data corresponding to the selected N tiles by the $M^{th}$ user identification code. Here, when a resultant value obtained by multiplying the data by the user identification code is greater than a reference value, the base station can determine that a user of corresponding user identification code transmitted the feedback data. Thereafter, the base station determines in step 613 if the detection was performed as many times as the number of combinations which select N tiles, and if not, returns to step 611 to try the detection again by selecting another group of N tiles. Here, the number of the selected tiles N is identical to the number of tiles required for the transmission of the feedback information.

In contrast, if the detection was performed as many times as the number of combinations which select N tiles, the base station checks if M is identical to the number of the user identification codes in step 615. If M is not identical to the number of the user identification codes, the base station renews M to M+1 in step 617, and returns to step 609 to repeat the process of applying different user identification code to the tiles in the same group. If M is identical to the number of the user identification codes, the base station proceeds to step 619 and checks if K is identical to the number of groups.

If it is determined in step 619 that K is not identical to the number of the groups, the base station proceeds to step 621 to renew K to K+1, and then returns to step 607 to repeat the same process for another group. If K is identical to the number of groups, the base station completes the algorithm.

Here, since the base station already has information on the code information on all users within a system, the base station can determine the feedback information as well as the ID of a terminal which transmitted the corresponding feedback information according to the applied code.

Figure 7:
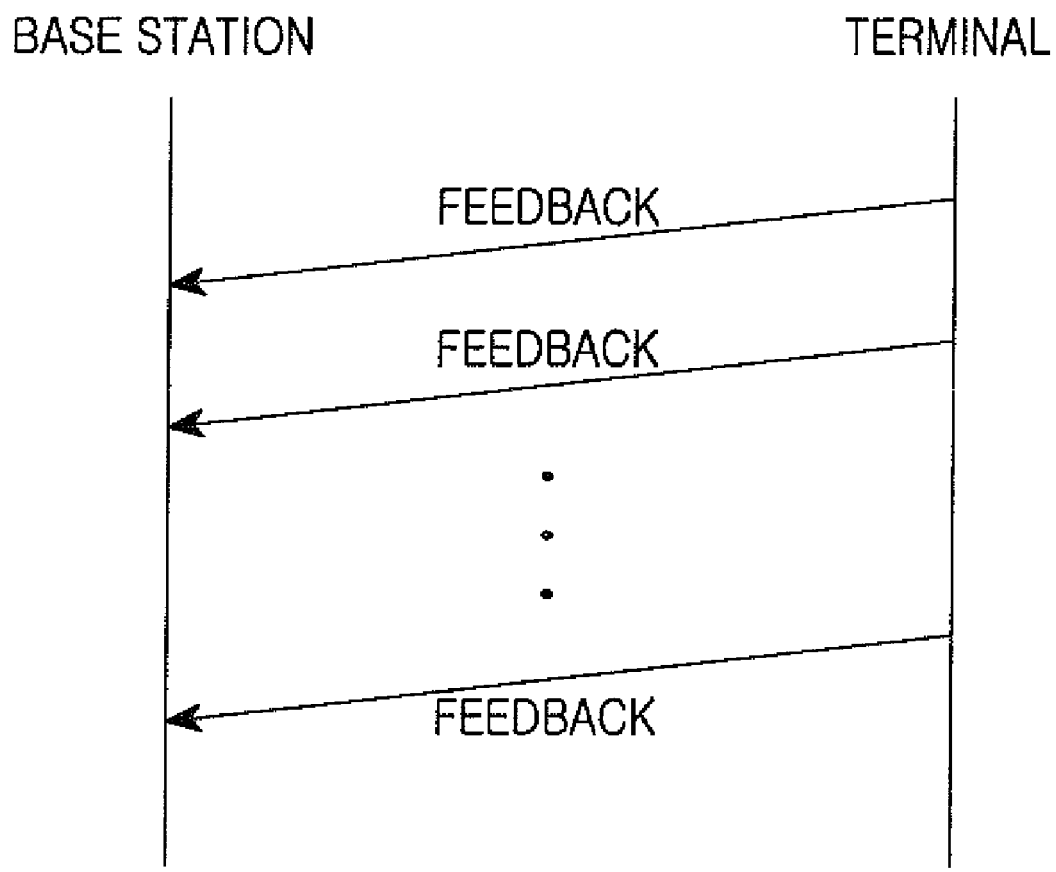
FIG. 7 is a flowchart illustrating transmission/reception of feedback related message between a base station and a terminal in a broadband wireless mobile communication system according to an exemplary embodiment of the present invention.

FIG. 7 is a flowchart illustrating transmission/reception of feedback-related message between a base station and a terminal in a broadband wireless mobile communication system according to an exemplary embodiment of present invention.

Referring to FIG. 7, unlike the conventional method where a base station allocates and reallocates additional feedback dedicated channels to a corresponding terminal for feedback, and the terminal transmits feedback information via the allocated channel, the terminal according to an exemplary embodiment of the present invention transmits feedback information to the base station in a feedback region in a random accessing method on an as needed basis, without a process of allocating an additional feedback channel.

As described above, in the TDD OFDM broadband wireless mobile communication system according to an exemplary embodiment of the present invention, the terminal divides the tiles used as an uplink feedback channel into groups, selects one preferred group among the divided groups through a downlink channel, selects as many tiles as is required for the transmission of feedback information in a corresponding group, and then transmits the feedback information via the selected feedback channel. Thereby, the present disclosure has the advantages of easily designing a feedback channel, and reducing the calculation amount required by the base station for checking the tile selection information of the terminal while enhancing resource usage efficiency of the uplink feedback channel. In particular, in the conventional feedback channel method used in the IEEE 802.16e system, when the feedback information is transmitted non-periodically, overhead is increased due to frequent allocation and reallocation of resources, and the feedback channel is allocated for more time periods than is necessary, causing a waste of resources. On the contrary, the present disclosure does not require an additional process of allocating and reallocating a feedback channel, thus overhead is reduced regardless of the periodicity of the feedback information. In addition, the feedback channel selected by the terminal is used only when necessary in consideration of the channel state, thereby enhancing efficiency of resource usage.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting feedback data in a mobile communication system comprising a base station and a terminal, the method comprising:
   dividing, by the terminal, tiles used as a feedback channel into a preset number of groups;
   selecting, by the terminal, one group among the preset number of groups using a downlink channel;
   selecting, by the terminal, a number of tiles, the number of tiles being equal to a number of tiles required for transmission of feedback data in the selected group; and
   mapping, by the terminal, feedback data to each selected tile.

2. The method of claim 1, wherein the selected group comprises one of a group corresponding to a best average downlink channel and a group to which the best downlink channel corresponds.

3. The method of claim 1, further comprising:
   multiplying, by the terminal, the mapped feedback data by a user identification code; and transmitting the feedback data to the base station.

4. The method of claim 3, wherein the user identification code comprises one of a pseudo noise (PN) code and a walsh code.

5. The method of claim 1, further comprising measuring, by the terminal, the downlink channel.

6. The method of claim 1, wherein the mapping of the feedback data comprises:
   arranging the selected tiles in an ascending order of a tile index; and
   mapping the feedback data to be transmitted to each arranged tile.

7. The method of claim 1, wherein a number of tiles in each group is identical to or greater than the number of tiles required for transmission of feedback data.

8. The method of claim 1, wherein the feedback data is generated non-periodically.

9. The method of claim 1, wherein the number of the selected tiles is identical to the number of tiles required for transmission of feedback data.

10. The method of claim 1, wherein the tiles may be divided into groups by one of a first allocation by sequentially allocating the first to $T'^{th}$ tiles to the first to $T'^{th}$ groups, the $T'+1^{th}$ to $2T'^{th}$ tiles to the first to $T'^{th}$ groups, and the remaining tiles to the first to $T'^{th}$ groups, a second allocation by allocating the first to $N^{th}$ tiles to a first group, the $N+1^{th}$ to $2N^{th}$ tiles to a second group, and the remaining tiles to the remaining groups, and a third allocation by mixing the first and second allocations, wherein T' comprises the number of groups and N comprises the number of tiles to be allocated to one group.

11. A method of receiving feedback data in a mobile communication system comprising a base station and a terminal, the method comprising:
   dividing, by the base station, tiles used as a feedback channel into a number of groups;
   selecting, by the base station, a group and a user identification code by using all possible combinations of all groups and all user identification codes; and
   detecting, by the base station, data by multiplying feedback data corresponding to tiles of the selected group by the selected user identification code.

12. The method of claim 11, wherein the detecting is attempted for a preset number of tiles in the selected group.

13. The method of claim 12, wherein the detecting is attempted for as many times as a number of combinations that select the preset number of tiles.

14. The method of claim 12, wherein a number of the selected tiles is identical to a number of tiles required for transmission of the feedback data.

15. The method of claim 11, wherein the user identification code comprises one of a pseudo noise (PN) code and a walsh code.

16. The method of claim 11, further comprising constructing, by the base station, a user identification code set.

17. The method of claim 16, wherein the user identification code set is constructed by using at least one of each usable user identification code and codes of users in an active state among terminals located within a current base station coverage area.

18. The method of claim 11, wherein the tiles may be divided into groups by one of a first allocation by sequentially allocating the first to $T'^{th}$ tiles to the first to $T'^{th}$ groups, the $T'+1^{th}$ to $2T'^{th}$ tiles to the first to $T'^{th}$ groups, and the remaining tiles to the first to $T'^{th}$ groups, a second allocation by allocating the first to $N^{th}$ tiles to a first group, the $N+1^{th}$ to $2N^{th}$ tiles to a second group, and the remaining tiles to the remaining groups, and a third allocation by mixing the first and second allocations, wherein T' comprises the number of groups and N comprises the number of tiles to be allocated to one group.

19. An apparatus for transmitting feedback data in a mobile communication system, the apparatus comprising:
   a tile divider for dividing tiles used as a feedback channel into a preset number of groups;
   a preferred group selector for selecting a group among the preset number of groups using a downlink channel;
   a tile selector for selecting a number of tiles, the number of tiles being equal to a number of tiles required for transmission of feedback data within the selected group; and
   a mapper for mapping feedback data to each selected tile.

20. The apparatus of claim 19, wherein the selected group comprises one of a group corresponding to a best average downlink channel and a group to which the best downlink channel corresponds.

21. The apparatus of claim 19, further comprising a user identification code applier for multiplying the mapped feedback data by a user identification code and for transmitting the feedback data to a base station.

22. The apparatus of claim 21, wherein the user identification code comprises one of a pseudo noise (PN) code and a walsh code.

23. The apparatus of claim 19, further comprising a channel measurer for measuring the downlink channel.

24. The apparatus of claim 19, wherein the data mapper for mapping the feedback data comprises:
   a unit for arranging the selected tiles in an ascending order of a tile index; and
   a unit for mapping the feedback data to be transmitted to each arranged tile.

25. The apparatus of claim 19, wherein a number of tiles in each group is identical to or greater than the number of tiles required for transmission of the feedback data.

26. The apparatus of claim 19, wherein the feedback data is generated non-periodically.

27. The apparatus of claim 19, wherein the number of the selected tiles is identical to the number of tiles required for transmission of the feedback data.

28. The apparatus of claim 19, wherein the tile divider divides tiles into groups by one of a first allocation by sequentially allocating the first to $T'^{th}$ tiles to the first to $T'^{th}$ groups, the $T'+1^{th}$ to $2T'^{th}$ tiles to the first to $T'^{th}$ groups, and the remaining tiles to the first to $T'^{th}$ groups, a second allocation by allocating the first to $N^{th}$ tiles to a first group, the $N+1^{th}$ to $2N^{th}$ tiles to a second group, and the remaining tiles to the remaining groups, and a third allocation by mixing the first and second allocations, wherein T' comprises the number of groups and N comprises the number of tiles to be allocated to one group.

29. An apparatus for receiving feedback data in a mobile communication system, the apparatus comprising:
a tile divider for dividing tiles used as a feedback channel into a preset number of groups;
a user identification code applier for selecting a group from the preset number of groups and a user identification code by using all possible combinations of all of the preset number of groups and all user identification codes; and
a detector for detecting data by multiplying feedback data corresponding to tiles of the selected group by the selected user identification code.

30. The apparatus of claim 29, wherein the detecting is attempted for a preset number of tiles in the selected group.

31. The apparatus of claim 30, wherein the detecting is attempted for as many times as a number of combinations that select the preset number of tiles.

32. The apparatus of claim 30, wherein a number of the selected tiles is identical to a number of tiles required for transmission of the feedback data.

33. The apparatus of claim 29, wherein the user identification code comprises one of a pseudo noise (PN) code and a walsh code.

34. The apparatus of claim 29, wherein the user identification code applier constructs a user identification code set.

35. The apparatus of claim 34, wherein the user identification code set is constructed by using at least one of each usable user identification code and codes of users in an active state among terminals located within a current base station coverage area.

36. The apparatus of claim 29, wherein the tile divider divides tiles into groups by one of a first allocation by sequentially allocating the first to $T'^{th}$ tiles to the first to $T'^{th}$ groups, the $T'+1^{th}$ to $2T'^{th}$ tiles to the first to $T'^{th}$ groups, and the remaining tiles to the first to $T'^{th}$ groups, a second allocation by allocating the first to $N^{th}$ tiles to a first group, the $N+1^{th}$ to $2N^{th}$ tiles to a second group, and the remaining tiles to the remaining groups, and a third allocation by mixing the first and second allocations, wherein T' comprises the number of groups and N comprises the number of tiles to be allocated to one group.

37. The apparatus of claim 29, wherein if a resultant value of the detection is greater than a reference value, the detector determines that the feedback data is transmitted by a user of a corresponding user identification code.

* * * * *